United States Patent
Bian et al.

(10) Patent No.: US 11,275,207 B2
(45) Date of Patent: Mar. 15, 2022

(54) MULTIMODE WAVEGUIDE BENDS WITH FEATURES TO REDUCE BENDING LOSS

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 16/989,214

(22) Filed: Aug. 10, 2020

(65) Prior Publication Data

US 2020/0393617 A1   Dec. 17, 2020

Related U.S. Application Data

(62) Division of application No. 16/441,678, filed on Jun. 14, 2019, now Pat. No. 10,816,727.

(51) Int. Cl.
*G02B 6/125* (2006.01)
*G02B 6/136* (2006.01)
*G02B 6/12* (2006.01)

(52) U.S. Cl.
CPC ............. *G02B 6/125* (2013.01); *G02B 6/136* (2013.01); *G02B 2006/12061* (2013.01); *G02B 2006/12119* (2013.01); *G02B 2006/12173* (2013.01)

(58) Field of Classification Search
CPC ............ G02B 6/125; G02B 6/136; G02B 2006/12119; G02B 2006/12173; G02B 2006/12061
See application file for complete search history.

(56) References Cited

U.S. PATENT DOCUMENTS

| 3,785,717 A | * | 1/1974 | Croset ............... G02B 6/12002 |
| | | | 385/132 |
| 4,492,425 A | * | 1/1985 | Kersten ............... G02F 1/3132 |
| | | | 385/27 |
| 6,522,822 B2 | | 2/2003 | Huang et al. |

(Continued)

FOREIGN PATENT DOCUMENTS

| JP | 4-237031 | * | 8/1992 |
| JP | H04237031 A | | 8/1992 |
| JP | 4-260005 | * | 9/1992 |

OTHER PUBLICATIONS

D. Gloge, "Bending Loss in Multimode Fibers with Graded and Ungraded Core Index," Appl. Opt. 11, 2506-2513 (1972).

(Continued)

*Primary Examiner* — Leslie C Pascal
(74) *Attorney, Agent, or Firm* — Thompson Hine LLP; Anthony Canale (57) ABSTRACT

Structures for a waveguide bend and methods of fabricating a structure for a waveguide bend. A waveguide core has a first section, a second section, and a waveguide bend connecting the first section with the second section. The waveguide core includes a first side surface extending about an inner radius of the waveguide bend and a second side surface extending about an outer radius of the waveguide bend. A curved strip is arranged over the waveguide bend adjacent to the first side surface or the second side surface.

20 Claims, 12 Drawing Sheets

(56) References Cited

U.S. PATENT DOCUMENTS

| | | | |
|---|---|---|---|
| 7,801,400 B2 * | 9/2010 | Sugiyama | G02F 1/035 |
| | | | 385/32 |
| 8,406,593 B2 | 3/2013 | Molin et al. | |
| 10,436,982 B1 | 10/2019 | Bian et al. | |
| 2012/0314990 A1 * | 12/2012 | Pitwon | G02B 6/1221 |
| | | | 385/14 |
| 2016/0109734 A1 * | 4/2016 | Porte | G02F 1/225 |
| | | | 385/3 |
| 2020/0012045 A1 | 1/2020 | Bian et al. | |
| 2021/0157177 A1 * | 5/2021 | Kharel | G02F 1/0356 |

OTHER PUBLICATIONS

Papakonstantinou et al., "Transition, radiation and propagation loss in polymer multimode waveguide bends", © 2007 Optical Society of America.

Gabrielli et al., "On-chip transformation optics for multimode waveguide bends", Nature Communications vol. 3, Article No. 1217 (2012).

Liu et al., "Compact bends for multi-mode photonic crystal waveguides with high transmission and suppressed modal crosstalk" © 2013 Optical Society of America.

\* cited by examiner

MULTIMODE WAVEGUIDE BENDS WITH FEATURES TO REDUCE BENDING LOSS

BACKGROUND

The present invention relates to photonics chips and, more specifically, to structures for a waveguide bend and methods of fabricating a structure for a waveguide bend.

Photonics chips may be used in many applications and systems including, but not limited to, data communication systems and data computation systems. A photonics chip integrates optical components, such as waveguides, optical switches, resonators, directional couplers, and waveguide bends, and electronic components, such as field-effect transistors, into a monolithic platform. Among other factors, layout area, cost, and operational overhead may be reduced by the integration of both types of components on the same monolithic platform.

Waveguide bends may be employed on a photonics chip to change the propagation direction of optical signals propagating in a waveguide core. Bending losses from inter-modal mixing and interference are an ubiquitous problem in multimode waveguide bends and may perturb the fundamental mode of the optical signal. Bending losses may be minimized by fabricating a waveguide bend with a large bending radius ranging from hundreds of microns to a millimeter or larger. However, the large size of such waveguide bends reduces the available space on the photonics chip for other optical and electronic components.

Improved structures for a waveguide bend and methods of fabricating a structure for a waveguide bend are needed.

SUMMARY

In an embodiment of the invention, a structure includes a waveguide core having a first section, a second section, and a waveguide bend connecting the first section with the second section. The waveguide core includes a first side surface and a second side surface, the first side surface extends about an inner radius of the waveguide bend, and the second side surface extends about an outer radius of the waveguide bend. The waveguide bend includes a central region and a side region that is arranged adjacent to the central region at the first side surface or the second side surface. The central region has a first thickness, and the side region has a second thickness that is less than the first thickness.

In an embodiment of the invention, a structure includes a waveguide core including a first section, a second section, and a waveguide bend connecting the first section with the second section. The waveguide core includes a first side surface and a second side surface, the first side surface extends about an inner radius of the waveguide bend, and the second side surface extends about an outer radius of the waveguide bend. The structure further includes a curved strip arranged over the waveguide bend adjacent to the first side surface or the second side surface.

In an embodiment of the invention, a method includes patterning a first layer to form a waveguide core having a first section, a second section, and a waveguide bend that connects the first section with the second section. The method further includes forming an etch mask over the first section of the waveguide core, the second section of the waveguide core, and a central region of the waveguide bend that exposes a side region of the waveguide bend adjacent to the central region of the waveguide bend at a side surface of the waveguide core. The method further includes etching partially through the side region of the waveguide bend with the etch mask over the first section of the waveguide core, the second section of the waveguide core, and the central region of the waveguide bend. The central region of the waveguide bend has a first thickness, and the side region of the waveguide bend has a second thickness that is less than the first thickness.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

With reference to FIGS. 1, 2, 2A, 2B, 2C and in accordance with embodiments of the invention, a structure 10 includes a waveguide core 12 having a section 14 that extends symmetrically along a longitudinal axis 13, section 16 that extends symmetrically along a longitudinal axis 15, and a waveguide bend 18 that are arranged over a dielectric layer 20. The longitudinal axis 13 of the section 14 of the waveguide core 12 is angled or inclined at an angle relative to the longitudinal axis 15 of the section 16 of the waveguide core 12 due to a change in direction provided by the waveguide bend 18. In an embodiment, the angle may be a right angle (i.e.,90°). The waveguide core 12 includes sidewalls in the form of side surfaces 22, 24 that project in a vertical direction from the dielectric layer 20. The side surfaces 22, 24 may be substantially linear or straight over the sections 14, 16 of the waveguide core 12, and the side surfaces 22, 24 may be non-linear or curved over the waveguide bend 18 of the waveguide core 12. In particular, the side surface 22 of the waveguide core 12 extends about the inner edge at an inner radius of the waveguide bend 18, and the side surface 24 of the waveguide core 12 extends about the outer edge at the outer radius of the waveguide bend 18.

The waveguide core 12 may be composed of a single-crystal semiconductor material, such as single-crystal silicon and, in particular, single-crystal silicon originating from a device layer of a silicon-on-insulator (SOI) wafer. The silicon-on-insulator wafer further includes a buried insulator layer composed of a dielectric material, such as silicon dioxide, that provides the dielectric layer 20 and a substrate 26 composed of a single-crystal semiconductor material, such as single-crystal silicon, under the buried insulator layer. The waveguide core 12 may be patterned from a layer of single-crystal semiconductor material (e.g., the device layer of the SOI wafer) by lithography and etching processes during front-end-of-line processing.

To that end, initial shapes for the waveguide bend 18 and sections 14, 16 of the waveguide core 12 are patterned with a lithography and etching process from the layer of single-crystal semiconductor material. The curved initial shape of the waveguide bend 18 may be the same width and have the same thickness as the initial shapes of the sections 14, 16. An etch mask is applied that fully masks the initial shapes of the sections 14, 16 and that only partially masks the initial shape of the waveguide bend 18. In the latter regard, the etch mask over the initial shape of the waveguide bend 18 covers the central portion 32 of the waveguide bend 18 from end 19 to end 21 and exposes the side regions 28, 30 of the waveguide bend 18 from end 19 to end 21. An etching process is then used, with the etch mask present, to reduce the thickness of the exposed side regions 28, 30 of the waveguide bend 18. In the representative embodiment, both exposed side regions 28, 30 of the waveguide bend 18 are thinned. The etch mask is stripped after thinning the side regions 28, 30 of the waveguide bend 18.

Due to the partial-thickness etching, the waveguide bend has the form of a ridge waveguide that includes peripheral or side regions 28, 30 of reduced thickness extending outwardly from the base of a central region 32. The central region 32 of the waveguide bend 18 may have a narrower width than either of the sections 14, 16 of the waveguide core 12. The total width of the regions 28, 30, 32 of the waveguide bend 18 may be substantially equal to the width of the section 14 of the waveguide core 12 and/or the section 16 of the waveguide core 12. The sections 14, 16 of the waveguide core 12 have the form of rib waveguides, as shown, for which the layer of single-crystal semiconductor material is fully etched to expose the dielectric layer 20 about the sections 14, 16 of the waveguide core 12. The sections 14, 16 of the waveguide core 12 and the central region 32 of the waveguide bend 18 may have substantially equal thicknesses, which may be approximately equal to the thickness of the patterned layer of single-crystal semiconductor material. The side regions 28, 30 have a thickness, t1, that is less than the thickness, t2, of the central region 32 of the waveguide bend 18 and the sections 14, 16 of the waveguide core 12. In an embodiment, the thickness of the side regions 28, 30 may range from about 10% of the thickness of the central region 32 to about 60% of the thickness of the central region 32.

The waveguide bend 18 has an end 19 that is directly connected and continuous with the section 14 of the waveguide core 12 to provide a seamless transition. The waveguide bend 18 has an opposite end 21 that is directly connected and continuous with the section 16 of the waveguide core 12 to provide a seamless transition. The end 19 of the waveguide bend 18 may provide an input port coupled with the section 14, and the end 21 of the waveguide bend 18 may provide an output port coupled with the section 16. The arc shapes of the side regions 28, 30 and central region 32, which extend between the opposite ends 19, 21, may share the same central angle of curvature. The side regions 28, 30 introduce respective indents in the curved portions of the side surfaces 22, 24 associated with the waveguide bend 18 and may extend over the full arc length of the waveguide bend 18 between the opposite ends 19, 21 of the waveguide bend 18. The side regions 28, 30 may terminate at the opposite ends 19, 21 of the waveguide bend 18. In the representative embodiment, the side regions 28, 30 of the waveguide bend 18 are symmetrically arranged relative to the central region 32 of the waveguide bend 18.

The side regions 28, 30, which are arranged at respective sides of the central region 32 of the waveguide bend 18 in the representative embodiment, provide features introducing additional perturbations that modify the properties of higher-order modes of an optical signal propagating in the waveguide core 12 such that mode mixing with the fundamental mode of the propagating optical signal can be significantly minimized. Specifically, the fundamental mode (e.g., TE0) guided in the waveguide bend 18 may be preserved such that insertion loss is low, while other modes (e.g., TE1, TE2, etc.) guided in the waveguide bend 18 may have altered profiles and altered effective indices that reduce crosstalk. This minimization in mode mixing may result in a reduction in the bending loss exhibited by the waveguide bend 18.

With reference to FIGS. 3, 3A, 3B, 3C in which like reference numerals refer to like features in FIGS. 2, 2A, 2B, 2C and at a subsequent fabrication stage, dielectric layers 34, 36, 38, 40 composed of respective dielectric materials are sequentially formed in a layer stack over the waveguide core 12. In the layer stack, the dielectric layer 34 is arranged over the dielectric layer 20, the dielectric layer 36 is arranged over the dielectric layer 34, the dielectric layer 38 is arranged over the dielectric layer 36, and the dielectric layer 40 is arranged over the dielectric layer 38. The waveguide core 12 is embedded or buried in the dielectric material of the dielectric layer 34, which acts as lateral cladding. The dielectric layer 34 may be composed of a dielectric material, such as silicon dioxide, deposited by chemical vapor deposition and planarized with, for example, chemical mechanical polishing to remove topography. The dielectric layer 36 may be composed of dielectric material, such as silicon dioxide, deposited by chemical vapor deposition or atomic layer deposition over the dielectric layer 34. The dielectric layer 38 may be composed of dielectric material, such as silicon nitride, deposited by chemical vapor deposition or atomic layer deposition over the dielectric layer 36. The dielectric layer 40 may be composed of dielectric material, such as silicon dioxide, deposited by chemical vapor deposition or atomic layer deposition over the dielectric layer 38. The dielectric layers 36, 38, 40 may be planar layers arranged in the layer stack over the planarized top surface of the dielectric layer 34.

A dielectric layer 42 of a contact level is formed by middle-of-line processing over the dielectric layer 40. The dielectric layer 42 may be composed of dielectric material, such as silicon dioxide, deposited by chemical vapor deposition using ozone and tetraethylorthosilicate (TEOS) as reactants.

A back-end-of-line stack, generally indicated by reference numeral 44, is formed by back-end-of-line processing over the dielectric layer 42 and the structure 10. The back-end-of-line stack 44 may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers.

In alternative embodiments, the waveguide core 12 may be fabricated using a different material, such as polysilicon or silicon nitride. In this instance, the waveguide core 12 may be arranged over one or more of the dielectric layers 34, 36, 38, 40.

Figure 4:
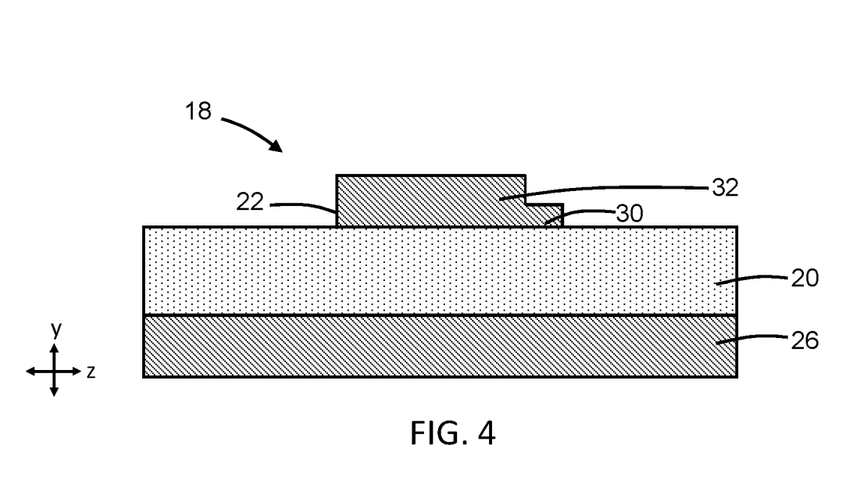
FIGS. 4 and 5 are cross-sectionals view of structures in accordance with alternative embodiments of the invention.

With reference to FIG. 4 and in accordance with alternative embodiments of the invention, the side region 28 of the waveguide bend 18 may be omitted from the waveguide core 12 so as to provide an asymmetrical arrangement. As a result, the central region 32 of the waveguide bend 18 may be enlarged in cross-sectional area, and the side region 30 of the waveguide bend 18 may project radially outwardly from the base of the central region 32 of the waveguide bend 18 at the side surface 24 of the waveguide core 12 extending about the outer radius of the waveguide bend 18.

Figure 5:
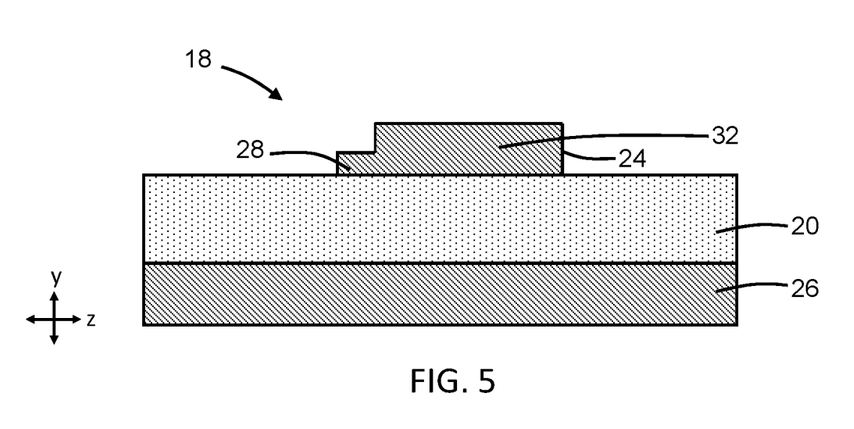

With reference to FIG. 5 and in accordance with alternative embodiments of the invention, the side region 30 may be omitted from the structure 10 so as to provide a different asymmetrical arrangement. As a result, the central region 32 of the waveguide bend 18 may be enlarged in cross-sectional area, and the side region 28 of the waveguide bend 18 may project radially outwardly from the base of the central region 32 of the waveguide bend 18 at the side surface 22 of the waveguide core 12 extending about the inner radius of the waveguide bend 18.

With reference to FIGS. 6, 7, 7A, 7B, 7C and in accordance with alternative embodiments of the invention, a structure 54 may include curved strips 46, 48 that are arranged in a vertical direction over opposite sides of the waveguide bend 18. In the structure 54, the sections 14, 16 and the waveguide bend 18 of waveguide core 12 may have a uniform or constant width. The curved strips 46, 48 are contained in a plane that is displaced vertically from a plane containing the waveguide bend 18. The curved strips 46, 48 may be composed of a different material than the waveguide core 12. In an embodiment, the curved strips 46, 48 may be composed of silicon nitride that is deposited and patterned with lithography and etching processes.

The curved strips 46, 48 may each be terminated, along the respective curve arcs, at an end 50 and at an end 52 that is opposite from the end 50. The end 50 may be arranged proximate to, and over, the seamless transition in the waveguide core 12 from the section 14 to the waveguide bend 18. The end 52 may be arranged proximate to, and over, the seamless transition in the waveguide core 12 from the section 16 to the waveguide bend 18.

One of the curved strips 46 may be arranged adjacent to the side surface 22 of the waveguide core 12 extending about the inner radius of the waveguide bend 18, and the other of the curved strips 48 may be arranged on the opposite side of the waveguide bend 18 adjacent to the side surface 24 of the waveguide core 12 extending about the outer radius of the waveguide bend 18. The curved strip 46 has an inner side surface 45 defining an inner edge at an inner radius that is less than the inner radius of the waveguide bend 18 and an outer side surface 47 defining an outer edge at an outer radius that may be equal to the inner radius of the waveguide bend 18. The side surfaces 45, 47 are joined by the ends 50, 52 of the curved strip 46. Similarly, the curved strip 48 has an inner side surface 49 with an inner radius that may be equal to the outer radius of the waveguide bend 18 and an outer side surface 51 at an outer radius that is greater than the outer radius of the waveguide bend 18. The side surfaces 49, 51 are joined by the ends 50, 52 of the curved strip 48. In an embodiment, the curved strips 46, 48 may have the same curvature as the respective side surfaces 22, 24 of the waveguide bend 18, and may be symmetrically positioned relative to a curved centerline of the waveguide bend 18.

Processing continues to form the dielectric layer 42, in which the curved strips 46, 48 are embedded, and the back-end-of-line stack 44 over the structure 54.

Figure 6:
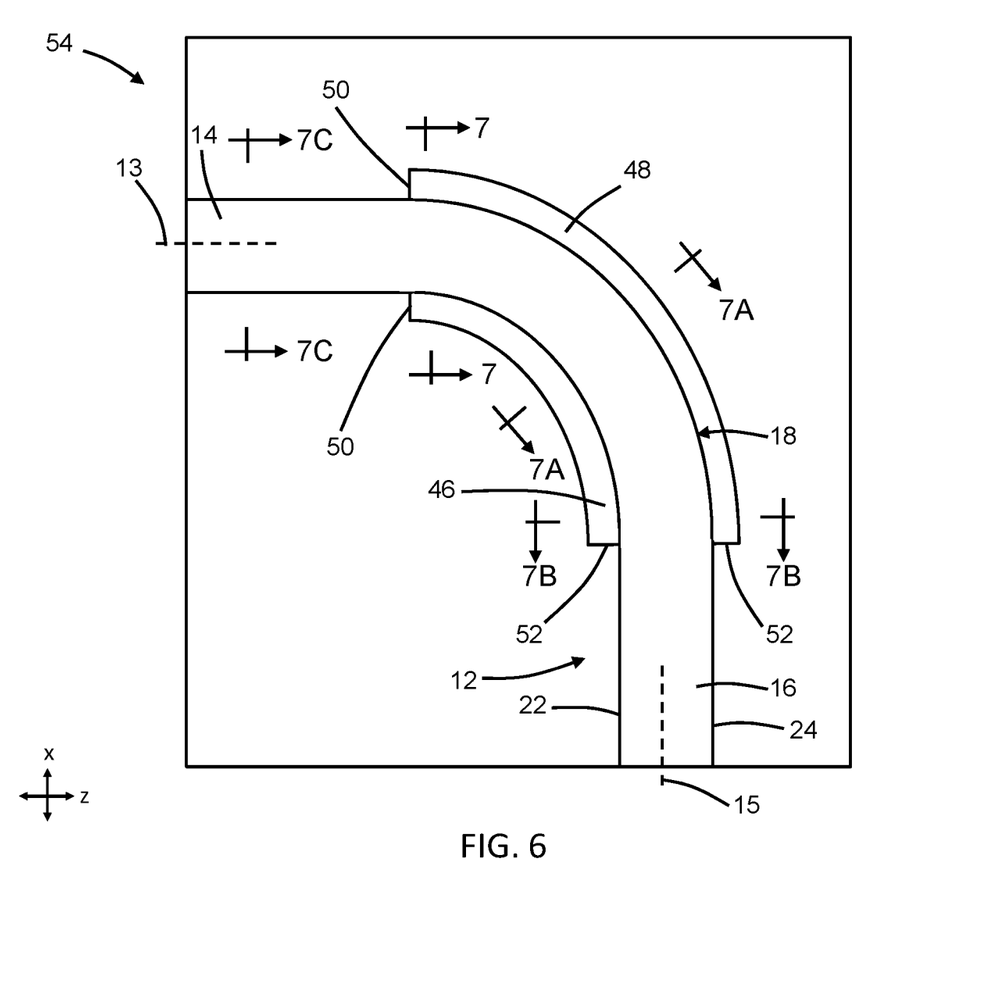
FIG. 6 is a top view of a structure at an initial fabrication stage of a processing method in accordance with embodiments of the invention.
Figure 7:
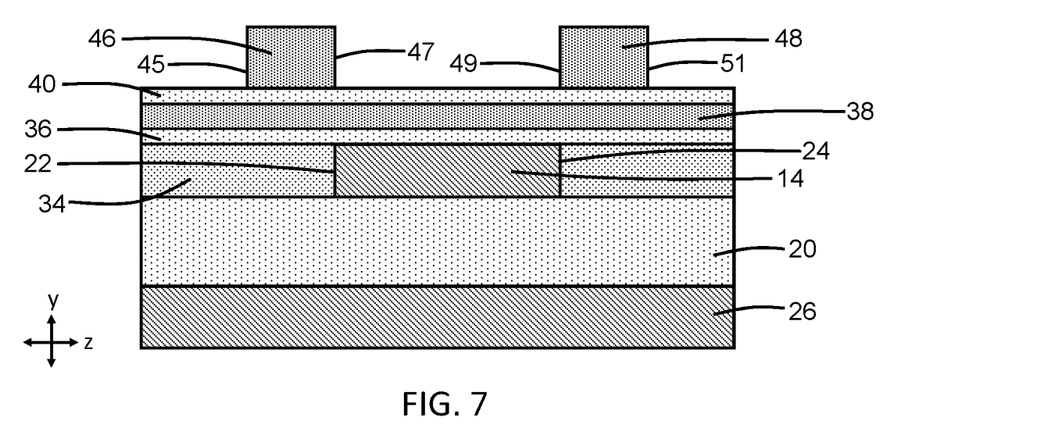
FIG. 7 is a cross-sectional view of the structure taken generally along line 7-7 in FIG. 6.

In an alternative embodiment, one or more additional curved strips may be added to the curved strips 46, 48. For example, another curved strip may be arranged interior of the inner radius of the curved strip 46, another curved strip may be arranged interior of the outer radius of the curved strip 48, or both additional curved strips may be added in combination.

The curved strips 46, 48 provide features introducing additional perturbations that modify the properties of higher-order modes of an optical signal propagating in the waveguide core 12 such that mode mixing with the fundamental mode of the propagating optical signal guided by the waveguide bend 18 can be significantly minimized. Specifically, the fundamental mode (e.g., TE0) guided by the waveguide bend 18 may be preserved such that insertion loss is low, while other modes (e.g., TE1, TE2, etc.) guided by the waveguide bend 18 may have altered profiles and altered effective indices that reduce crosstalk. This minimization in mode mixing may result is a reduction in the bending loss exhibited by the waveguide bend 18.

Figure 7A:
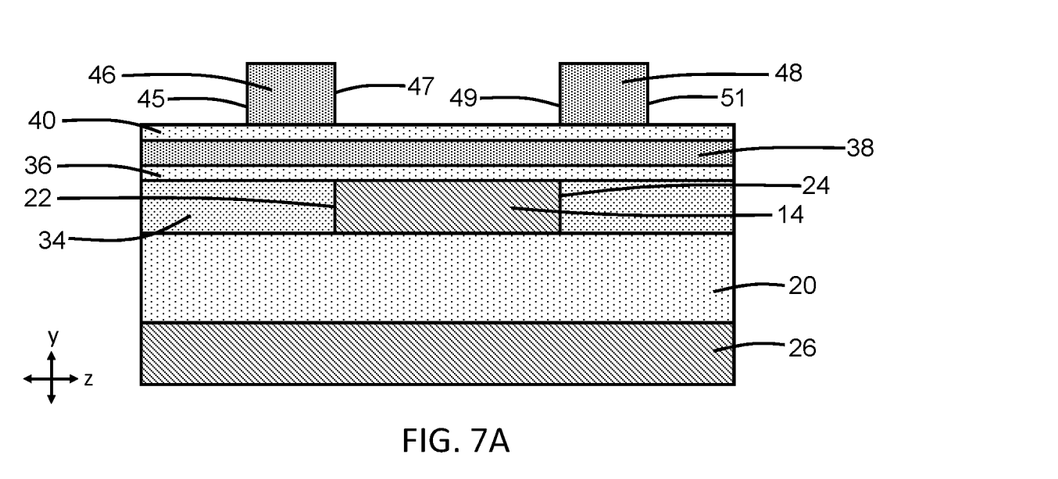
FIG. 7A is a cross-sectional view of the structure taken generally along line 7A-7A in FIG. 6.
Figure 7B:
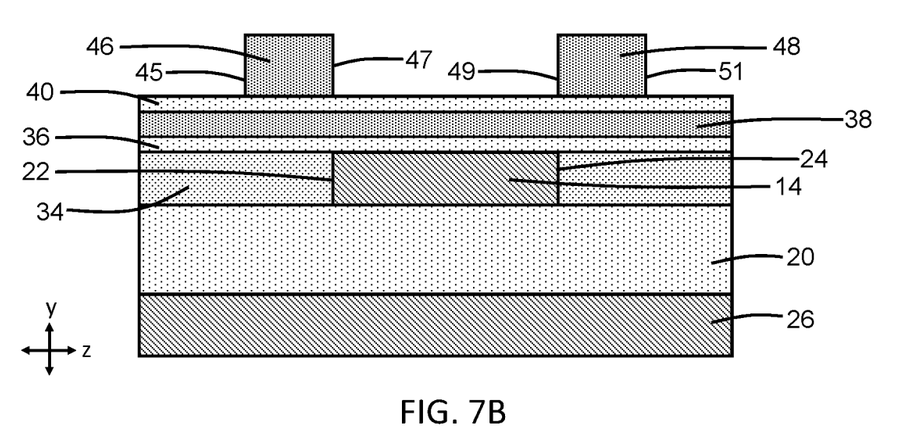
FIG. 7B is a cross-sectional view of the structure taken generally along line 7B-7B in FIG. 6.
Figure 7C:
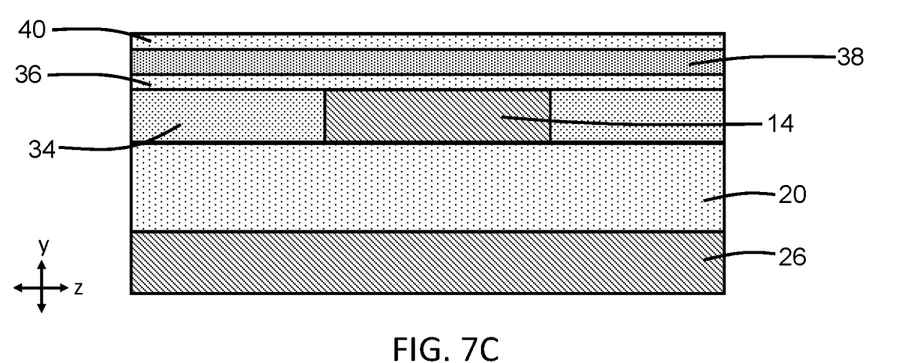
FIG. 7C is a cross-sectional view of the structure taken generally along line 7C-7C in FIG. 6.
Figure 8:
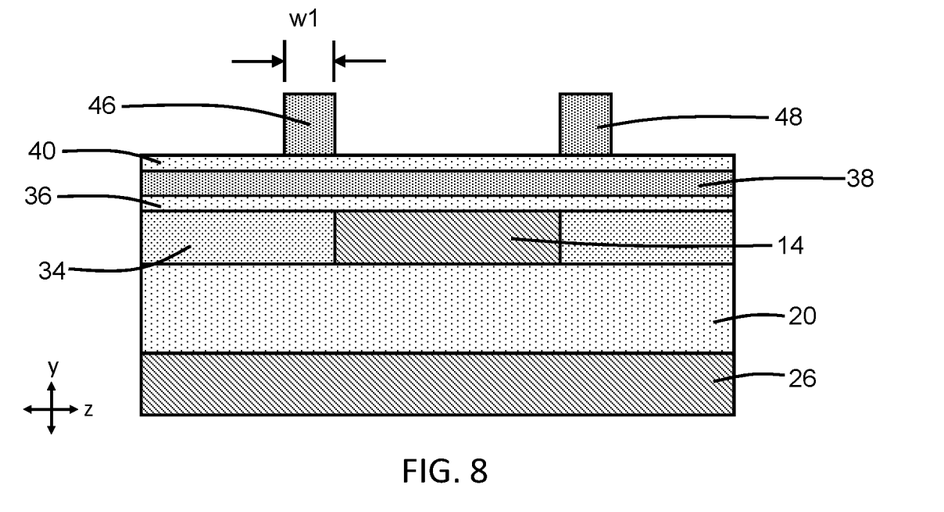
FIGS. 8, 8A, and 8B are cross-sectional views of structures in accordance with alternative embodiments of the invention.
Figure 8A:
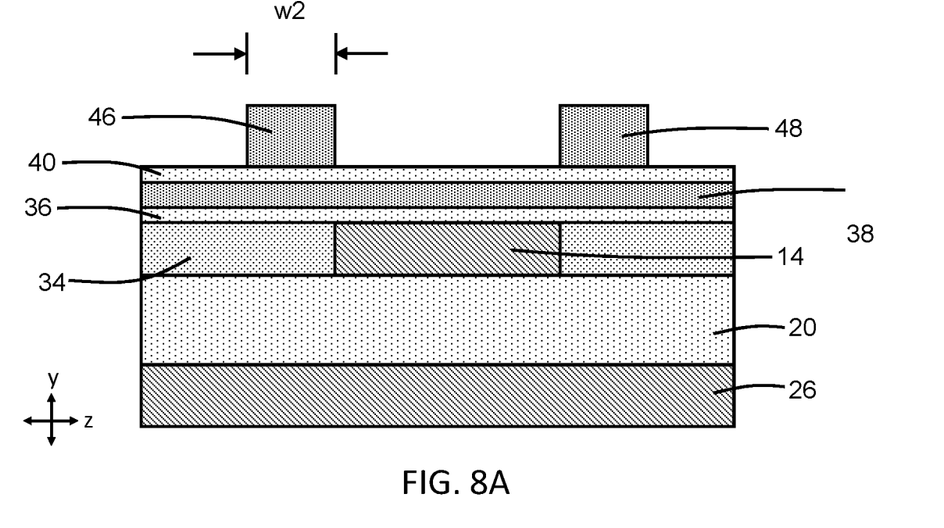
Figure 8B:
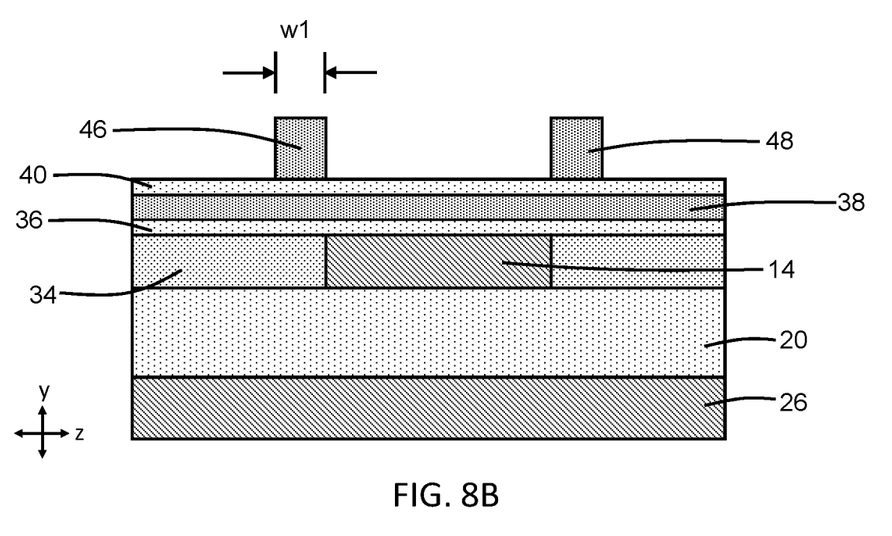

With reference to FIGS. 8, 8A, 8B in which like reference numerals refer to like features in FIGS. 7, 7A, 7B and in accordance with alternative embodiments of the invention, the curved strips 46, 48 may each have widths that vary as a function of position along their curved lengths. The width, w1, of the curved strips 46, 48 adjacent to their opposite ends 50, 52 may be greater than the width, w2, of the curved strips 46, 48 at locations between the opposite ends 50, 52. Processing continues to form the dielectric layer 42, in which the curved strips 46, 48 are embedded, and the back-end-of-line stack 44 over the structure 54.

The width variation may be gradual and may progressively change by small increments, particularly near the opposite ends 50, 52 of the curved strips 46, 48. The width variation may be effective to reduce insertion loss.

Figure 1:
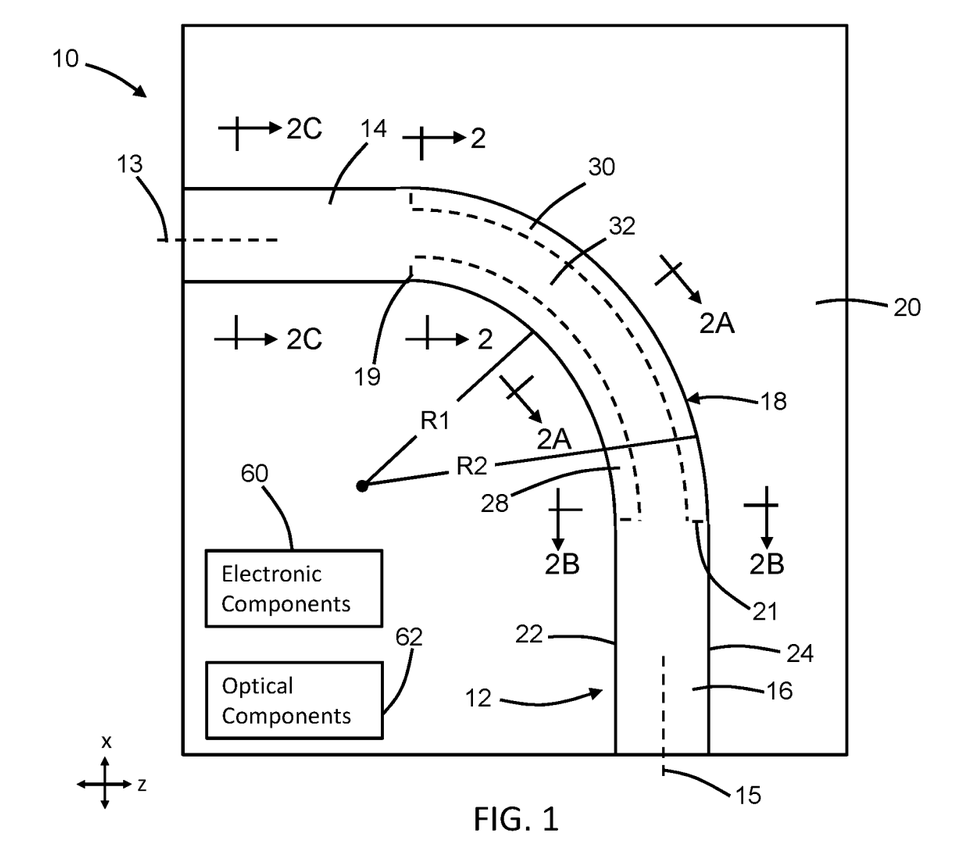
FIG. 1 is a diagrammatic top view of a structure at an initial fabrication stage of a processing method in accordance with embodiments of the invention.
Figure 2:
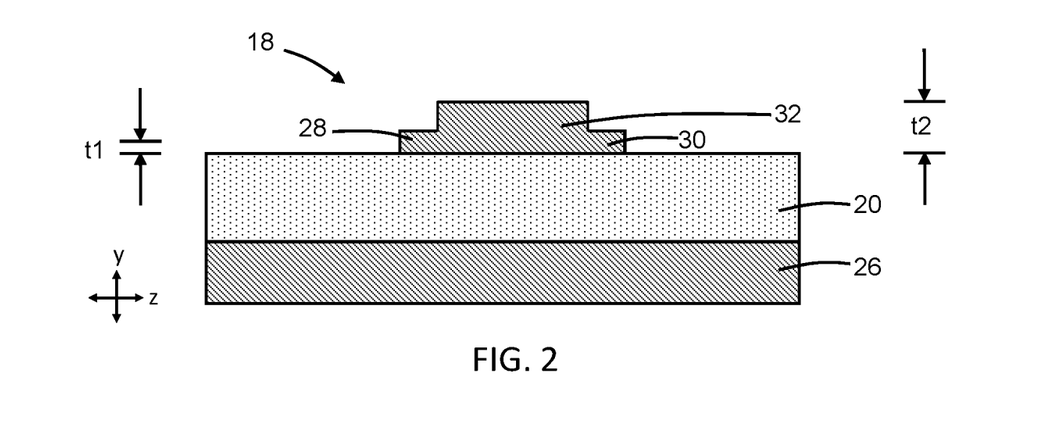
FIG. 2 is a cross-sectional view of the structure taken generally along line 2-2 in FIG. 1.
Figure 2A:
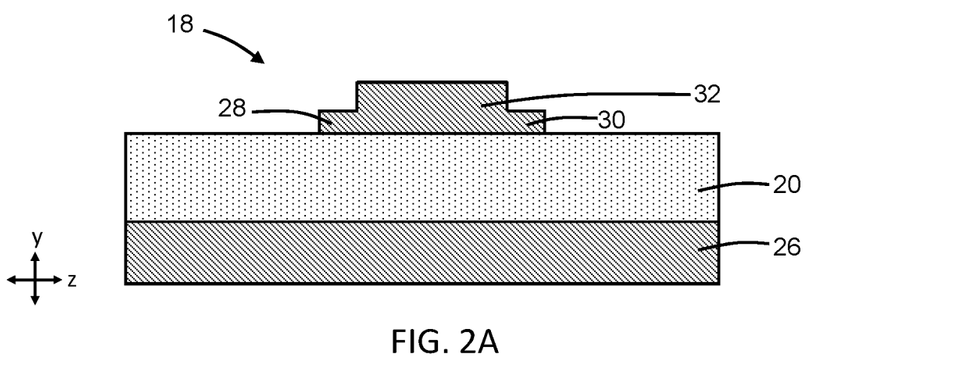
FIG. 2A is a cross-sectional view of the structure taken generally along line 2A-2A in FIG. 1.
Figure 2B:
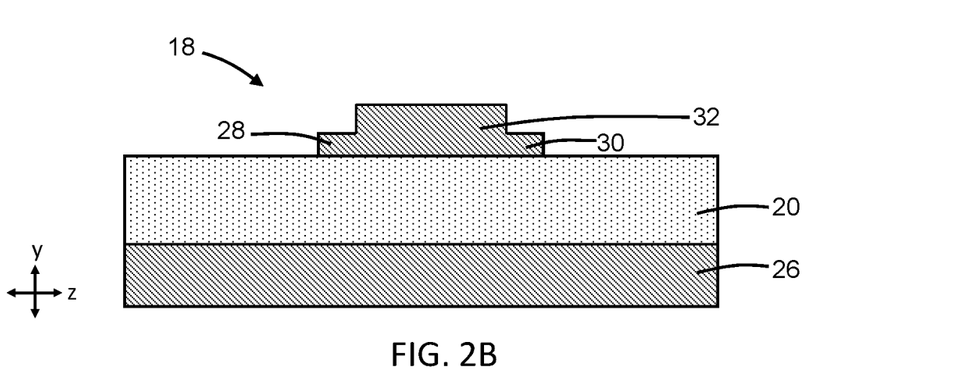
FIG. 2B is a cross-sectional view of the structure taken generally along line 2B-2B in FIG. 1.
Figure 2C:
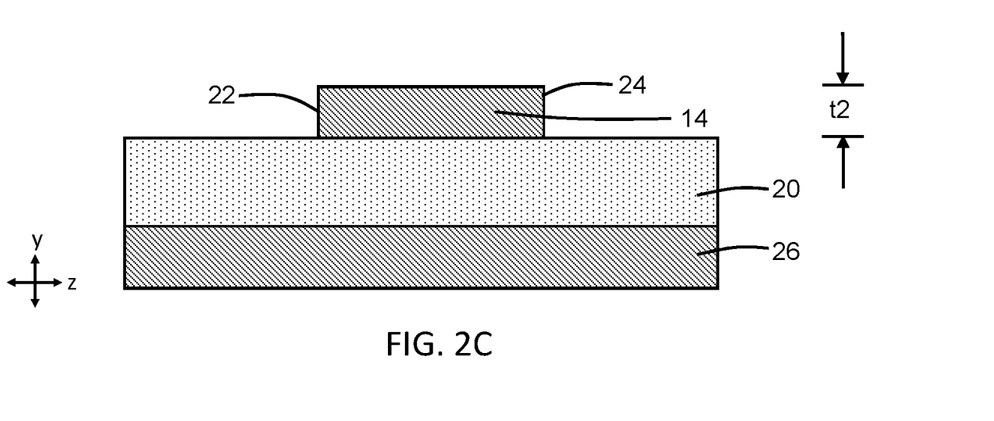
FIG. 2C is a cross-sectional view of the structure taken generally along line 2C-2C in FIG. 1.
Figure 3:
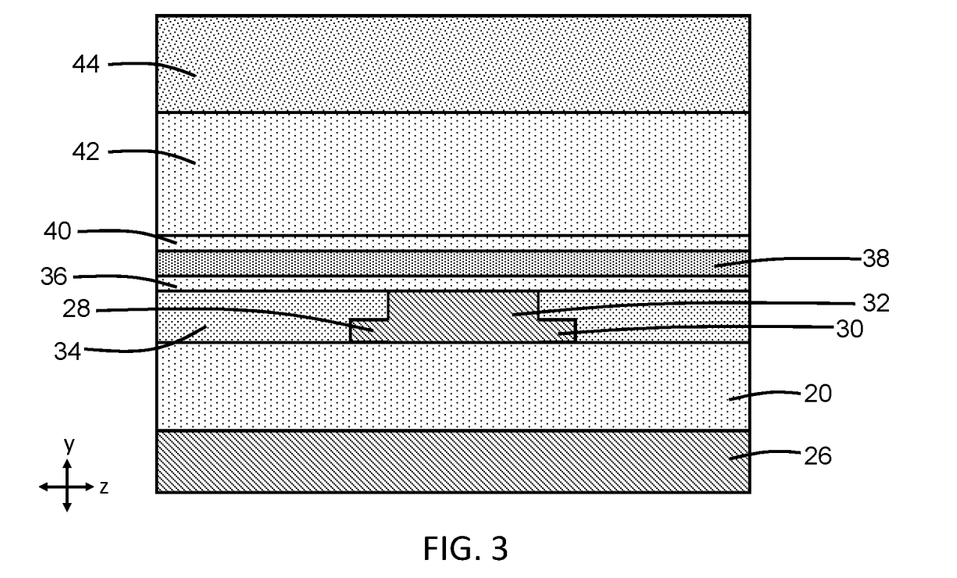
FIGS. 3, 3A, 3B, 3C are cross-sectional views of the structure of FIGS. 2, 2A, 2B, 2C at a subsequent fabrication stage of the processing method.
Figure 3A:
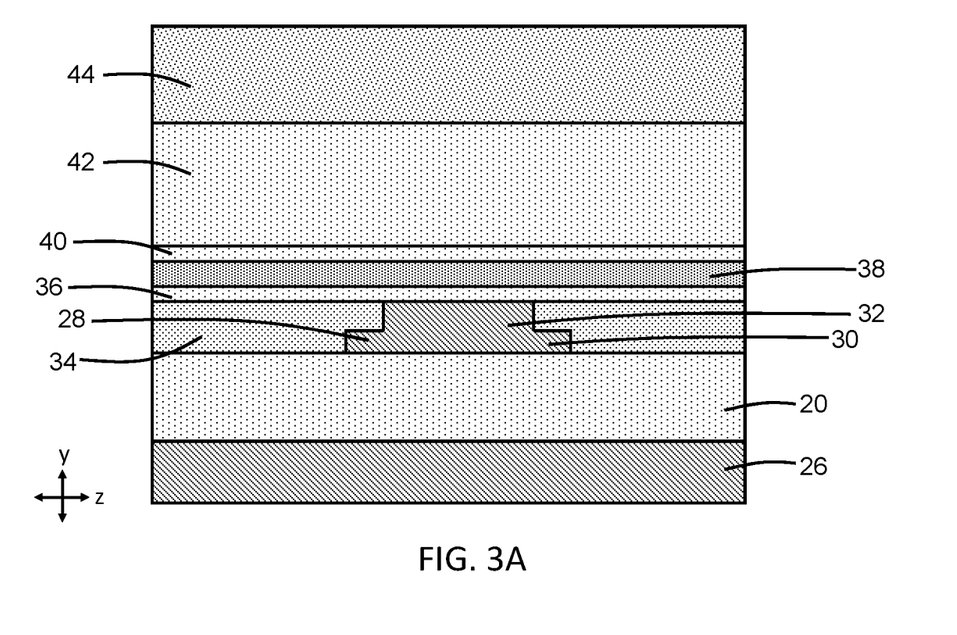
Figure 3B:
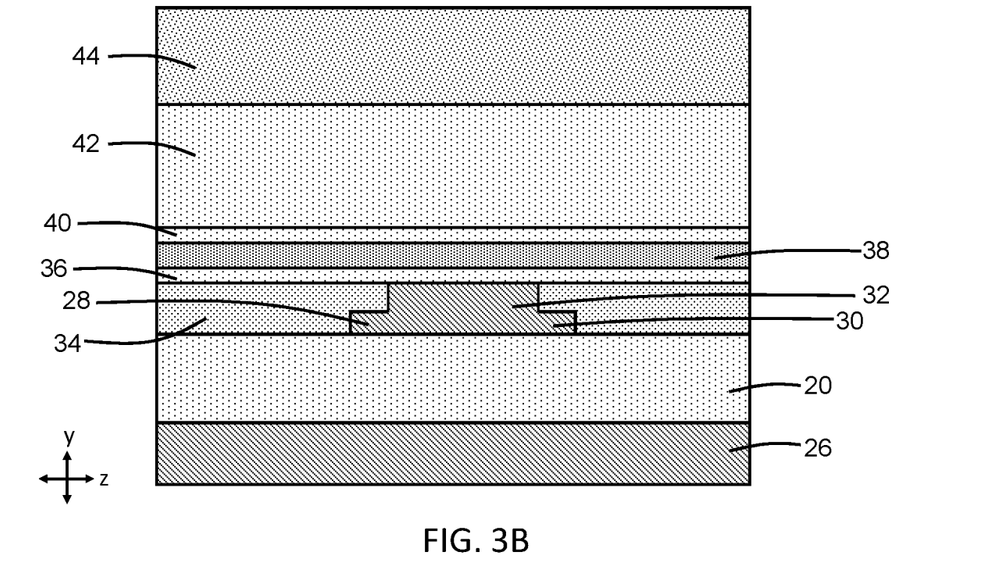
Figure 3C:
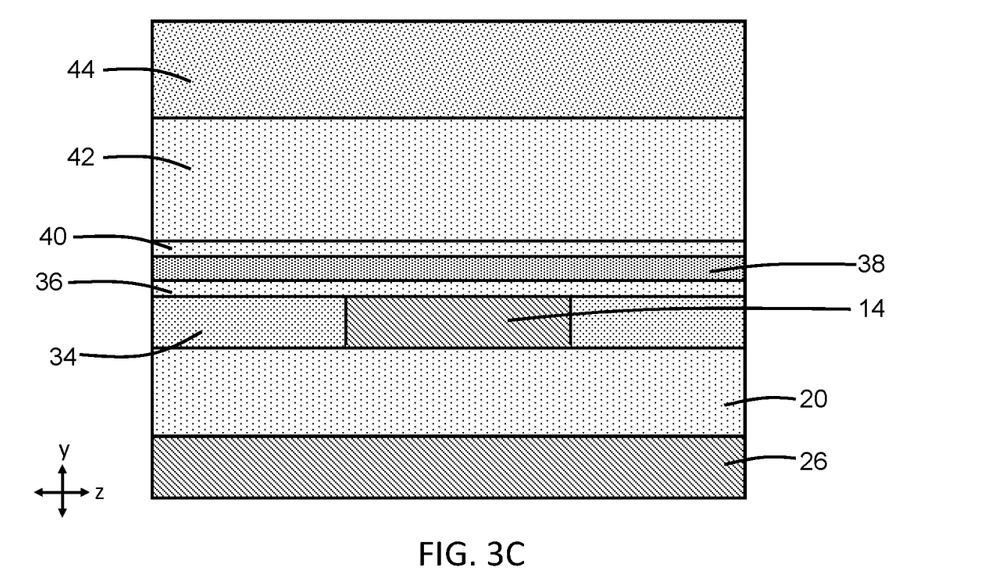
Figure 9:
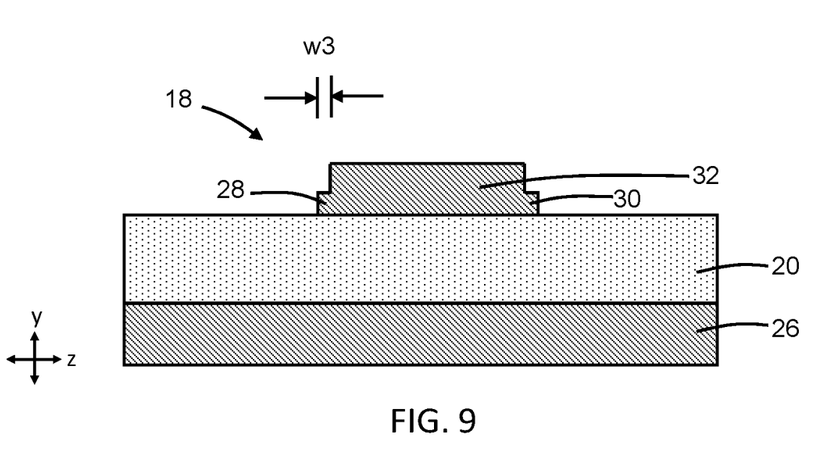
FIGS. 9, 9A, and 9B are cross-sectional views of structures in accordance with alternative embodiments of the invention.
Figure 9A:
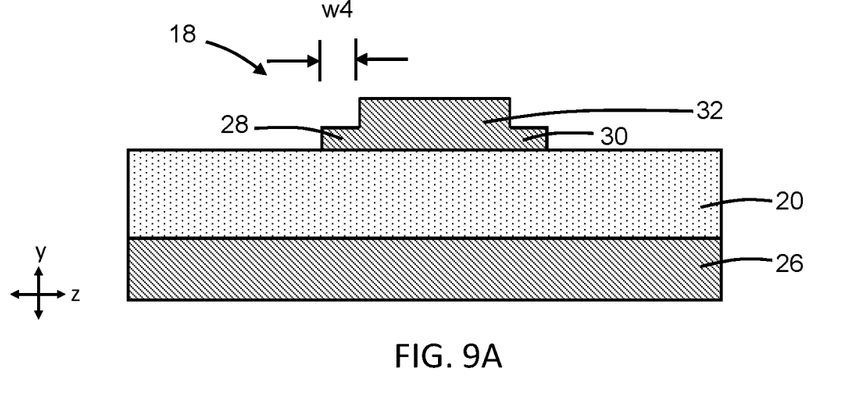
Figure 9B:
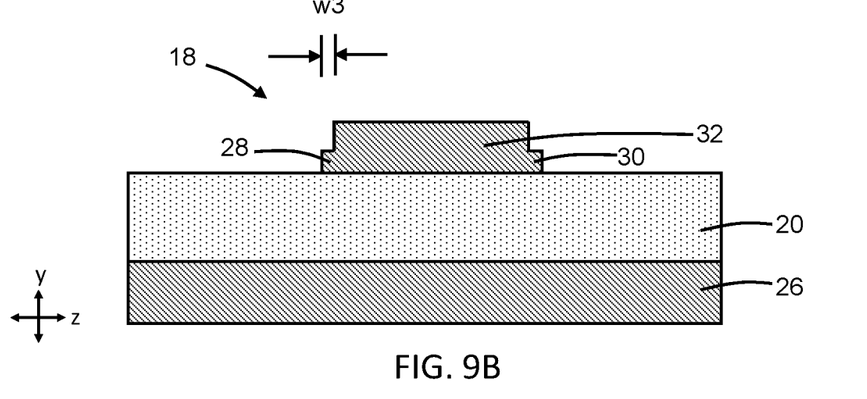

With reference to FIGS. 9, 9A, 9B in which like reference numerals refer to like features in FIGS. 2, 2A, 2B and in accordance with alternative embodiments of the invention, the side regions 28, 30 of the waveguide bend 18 may be modified to have varying widths. The width, w3, of the side regions 28, 30 adjacent to the opposite ends of the waveguide bend 18 may be greater than the width, w4, of the side regions 28, 30 48 at locations between the opposite ends of the waveguide bend 18. Processing continues to form the dielectric layer 42 and the back-end-of-line stack 44 over the structure 10.

The width variation may be gradual and may progressively change by small increments, particularly near the opposite terminating ends 19, 21 of the waveguide bend 18 at which the side regions 28, 30 terminate. The width variation may be effective to reduce insertion loss.

Figure 10:
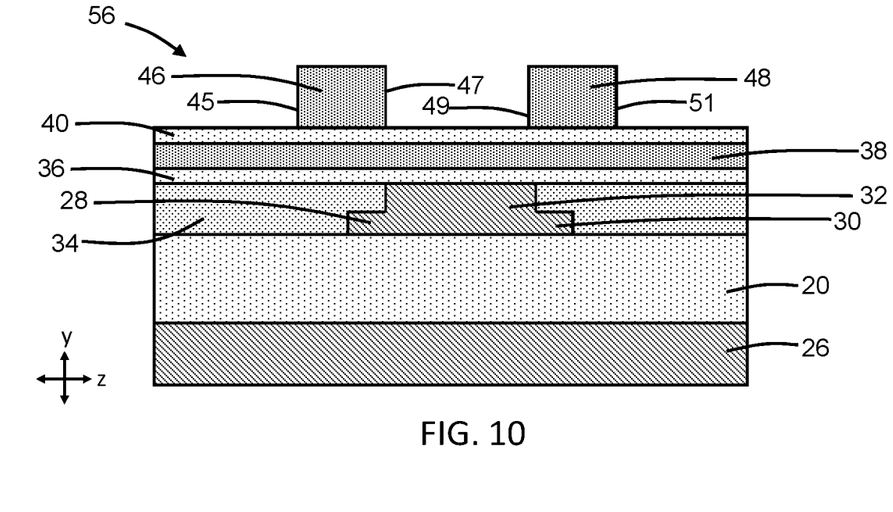
FIGS. 10, 10A, and 10B are cross-sectional views of structures in accordance with alternative embodiments of the invention.
Figure 10A:
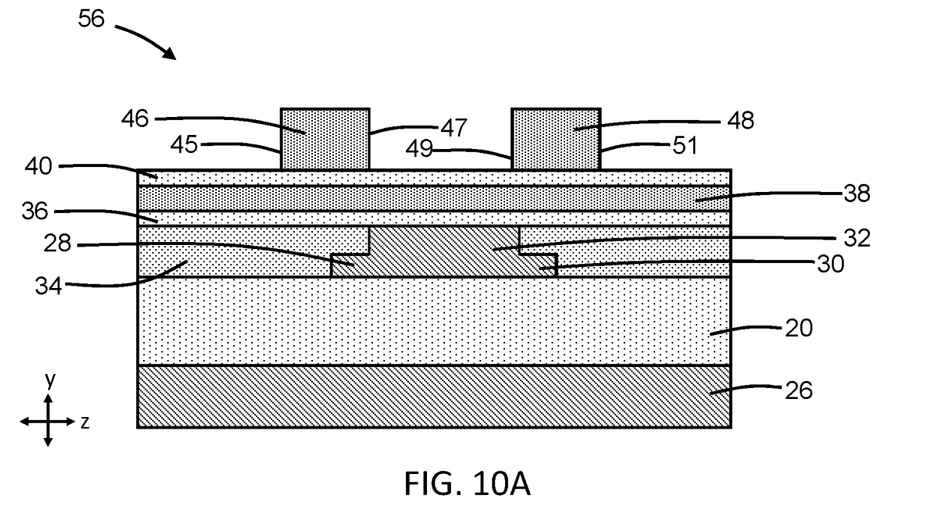
Figure 10B:
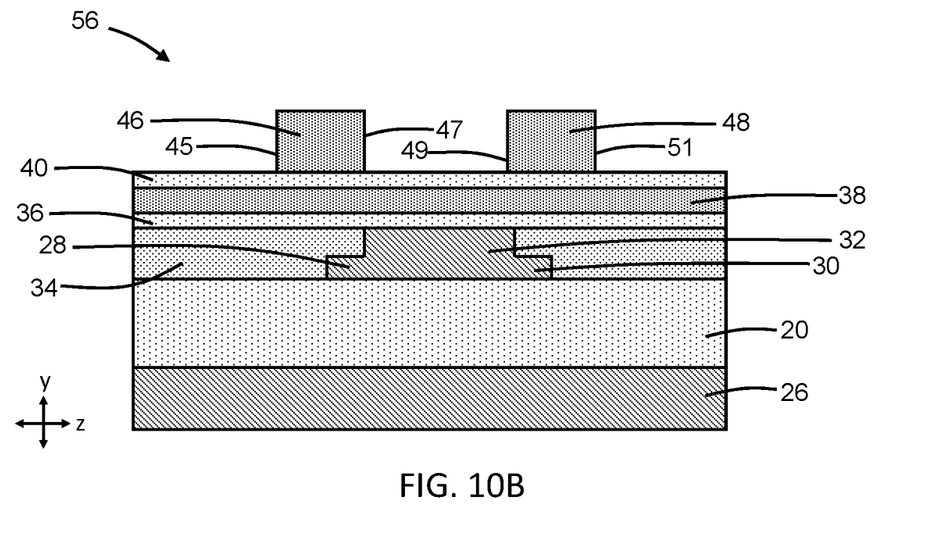

With reference to FIGS. 10, 10A, 10B in which like reference numerals refer to like features in FIGS. 2, 2A, 2B and in accordance with alternative embodiments of the invention, the waveguide bend 18 including the side regions 28, 30 may be used in combination with the curved strips 46, 48 to provide a hybrid or composite structure 56. The curved strip 46 is displaced in a vertical direction (i.e., in the y-direction in the y-z plane) from the side region 28, and the curved strip 48 is displaced in the vertical direction from the side region 30. The dielectric layers 36, 38, 40 are arranged in a vertical direction between the side regions 28, 30 and the curved strips 46, 48. The curved strip 46 may be arranged to overlap in a lateral direction with the side region 28 of the waveguide bend 18, and the curved strip 48 may be arranged to overlap in a lateral direction with the side region 30 of the waveguide bend 18. In an embodiment, the overlap may be complete such that the side region 28 is fully arranged in a lateral direction (i.e., in the z-direction in the y-z plane) between the inner side surface 45 and the outer side surface 47 of the curved strip 46, and the side region 30 is fully arranged in the lateral direction between the inner side surface 49 and the outer side surface 51 of the curved strip 48.

Processing continues to form the dielectric layer 42, in which the curved strips 46, 48 are embedded, and the back-end-of-line stack 44 over the structure 10.

In alternative embodiments of the composite structure 56, both of the curved strips 46, 48 may be used in combination with the side region 28 or with the side region 30, only the curved strip 46 may be used in combination with the side region 28 or with the side region 30, or only the curved strip 48 may be used in combination with the side region 28 or with the side region 30. In addition, the widths of the curved strips 46, 48 and/or the widths of the side regions 28, 30 may be varied in the composite structure 56 based on these combinations.

The structures 10, 54, 56, in any of the embodiments described herein, may be integrated into a photonics chip that includes electronic components 60 (FIG. 1) and additional optical components 62 (FIG. 1) formed on the same chip to provide a monolithic platform. For example, the electronic components 60 may include field-effect transistors that are fabricated by CMOS front-end-of-line (FEOL) processing, and the optical components 62 may include resonators, optical switches, and directional couplers, as well as additional waveguides that may or may not include bends.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or "in direct contact with" another feature if intervening features are absent. A feature may be "indirectly on" or "in indirect contact with" another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a waveguide core including a first section, a second section, and a waveguide bend connecting the first section with the second section, the waveguide core including a first side surface and a second side surface, the first side surface extending about an inner radius of the waveguide bend, and the second side surface extending about an outer radius of the waveguide bend; and
    a first curved strip arranged over the waveguide bend, the first curved strip positioned adjacent to the first side surface or the second side surface of the waveguide bend,
    wherein the first curved strip comprises silicon nitride, and the waveguide bend comprises single-crystal silicon.

2. The structure of claim 1 wherein the first curved strip is positioned adjacent to the first side surface.

3. The structure of claim 2 further comprising:
    a second curved strip arranged over the waveguide bend, the second curved strip positioned adjacent to the second side surface, and the second curved strip comprises silicon nitride.

4. The structure of claim 3 wherein the first curved strip and the second curved strip are contained in a plane that is displaced vertically from a plane containing the waveguide bend.

5. The structure of claim 1 wherein the first curved strip is positioned adjacent to the second side surface.

6. The structure of claim 1 wherein the first curved strip has a width that varies as a function of position along a curvature of the first curved strip.

7. The structure of claim 1 wherein the first curved strip is contained in a first plane that is displaced vertically from a second plane containing the waveguide bend.

8. The structure of claim 1 wherein the first curved strip includes a first end and a second end, and the first curved strip terminates at the first end and at the second end.

9. The structure of claim 1 wherein the first curved strip includes a first side surface defining an inner edge at an inner radius that is less than the inner radius of the waveguide bend.

10. The structure of claim 9 wherein the first curved strip includes a second side surface defining an outer edge at an outer radius that is equal to the inner radius of the waveguide bend.

11. The structure of claim 1 wherein the first curved strip includes a first side surface defining an outer edge at an outer radius that is greater than the outer radius of the waveguide bend.

12. The structure of claim 11 wherein the first curved strip includes a second side surface defining an inner edge at an inner radius equal to the outer radius of the waveguide bend.

13. The structure of claim 1 wherein the first curved strip and the waveguide bend have equal curvatures.

14. A method comprising:
patterning a first layer to form a waveguide core having a first section, a second section, and a waveguide bend that connects the first section with the second section;
forming one or more dielectric layers arranged over the waveguide core;
depositing a second layer on the one or more dielectric layers; and
patterning the second layer to form a first curved strip over the waveguide bend,
wherein the first curved strip comprises silicon nitride, the waveguide bend comprises single-crystal silicon, the first curved strip is positioned adjacent to a first side surface or a second side surface of the waveguide bend, the first side surface of the waveguide core extends about an inner radius of the waveguide bend, and the second side surface of the waveguide core extends about an outer radius of the waveguide bend.

15. The method of claim 14 wherein the first curved strip is positioned adjacent to the first side surface.

16. The method of claim 15 wherein the second layer is patterned to form a second curved strip arranged over the waveguide bend, the second curved strip is positioned adjacent to the second side surface, and the second curved strip comprises silicon nitride.

17. The method of claim 14 wherein the first curved strip is positioned adjacent to the second side surface.

18. The method of claim 14 wherein the first curved strip is formed with a width that varies as a function of position along a curvature of the first curved strip.

19. The method of claim 14 wherein the first curved strip includes a first side surface defining an inner edge at an inner radius that is less than the inner radius of the waveguide bend, and the first curved strip includes a second side surface defining an outer edge at an outer radius that is equal to the inner radius of the waveguide bend.

20. The method of claim 14 wherein the first curved strip includes a first side surface defining an outer edge at an outer radius that is greater than the outer radius of the waveguide bend, and the first curved strip includes a second side surface defining an inner edge at an inner radius equal to the outer radius of the waveguide bend.

* * * * *